(12) United States Patent
Tallent et al.

(10) Patent No.: US 6,741,774 B2
(45) Date of Patent: May 25, 2004

(54) FIBER OPTIC DEVICE WITH ENHANCED RESISTANCE TO ENVIRONMENTAL CONDITIONS AND METHOD

(75) Inventors: Jack R. Tallent, Baltimore, MD (US); Arthur J. Hoffman, III, Crofton, MD (US)

(73) Assignee: Gould Fiber Optics, Inc., Millersville, MD (US)

( * ) Notice: Subject to any disclaimer, the term of this patent is extended or adjusted under 35 U.S.C. 154(b) by 0 days.

(21) Appl. No.: 10/160,165

(22) Filed: Jun. 4, 2002

(65) Prior Publication Data

US 2003/0223693 A1 Dec. 4, 2003

(51) Int. Cl.⁷ .......................... G02B 6/255; G02B 6/26; G02B 6/42; C03B 37/028
(52) U.S. Cl. ............................ 385/39; 385/42; 385/96; 65/406; 65/408; 65/411
(58) Field of Search ............................ 385/39, 42, 43, 385/95, 96; 65/406–411

(56) References Cited

U.S. PATENT DOCUMENTS

| | | | |
|---|---|---|---|
| 4,138,194 A | 2/1979 | Beasley et al. | 385/143 |
| 4,515,612 A | 5/1985 | Burrus, Jr. et al. | 65/426 |
| 4,632,513 A | 12/1986 | Stowe et al. | 216/24 |
| 4,689,065 A * | 8/1987 | Krause | 65/407 |
| 4,798,436 A | 1/1989 | Mortimore | 385/43 |
| 4,798,438 A | 1/1989 | Moore et al. | 385/43 |
| 5,011,252 A | 4/1991 | Thorncraft et al. | 385/43 |
| 5,104,433 A | 4/1992 | Chapin et al. | 65/3.1 |
| 5,204,927 A | 4/1993 | Chin et al. | 385/121 |
| 5,205,851 A | 4/1993 | Suganuma et al. | 65/4.21 |
| 5,216,731 A | 6/1993 | Murphy et al. | 385/43 |
| 5,217,517 A | 6/1993 | Rossberg | 65/29 |
| 5,222,167 A | 6/1993 | Jean et al. | 385/45 |
| 5,223,014 A | 6/1993 | Yamauchi et al. | 65/4.21 |
| 5,298,291 A | 3/1994 | Klinger et al. | 427/513 |
| 5,302,316 A | 4/1994 | Hashimoto et al. | 252/183.1 |
| 5,355,426 A | 10/1994 | Daniel et al. | 385/39 |
| 5,405,657 A | 4/1995 | Bastian et al. | 427/501 |
| 5,409,777 A | 4/1995 | Kennedy et al. | 428/411.1 |
| 5,730,922 A | 3/1998 | Babb et al. | 264/258 |
| 5,744,514 A | 4/1998 | Shustack | 385/128 |
| 5,787,218 A | 7/1998 | Ohtaka et al. | 385/123 |
| 5,796,893 A | 8/1998 | Huang et al. | 385/43 |
| 5,822,482 A | 10/1998 | Atkeisson et al. | 385/51 |
| 5,891,930 A | 4/1999 | Lapin et al. | 522/31 |

(List continued on next page.)

OTHER PUBLICATIONS

Maack et al., "Confirmation of a Water Diffusion Model for Splitter Coupling Ration Drift Using Long Term Reliability Data," AUGAT Aster, Inc., 86 S. Street, Hopkinton, MA (pp. 559–566).

Cryan et al., "Long Term Splitting Ration Drifts in Singlemode Fused Fiber Optic Splitters," Proc. Nat. Fiber Opt. Eng. Conf., Jun. 18–22, 1995 (pp. 746–757).

Paul J. Lemaine, "Hydrogen Induced Losses And Their Effects On Optical Fiber Reliability", *Critical Reviews*, vol. CR50, pp. 80–104. Oct., 1994.

SriRaman Kannan et al, "The Mastercurve Method: Analysis Of Diverse Reliability Issues In Optical Fibers And Fiber Gratings Through A Unified Approach", *Critical Reviews*, vol. CR73, pp. 45–67. Sep. 1999.

*Primary Examiner*—Brian Healy
*Assistant Examiner*—Kevin S. Wood
(74) *Attorney, Agent, or Firm*—Shaw Pittman LLP (57) ABSTRACT

A method for producing fiber optic devices having improved intrinsic resistance to external environmental conditions and a fiber optic device made my the method are disclosed. The fabrication method produces an optic device that is treated with deuterium. The method includes a step for treating and/or making optical devices in the presence of a flame produced by the combustion of deuterium gas or a mixture including deuterium.

21 Claims, 8 Drawing Sheets

U.S. PATENT DOCUMENTS

| | | | |
|---|---|---|---|
| 5,985,374 A | 11/1999 | Grabbe et al. | 427/444 |
| 6,004,477 A | 12/1999 | Nakagawa et al. | 252/88.28 |
| 6,018,965 A | 2/2000 | Bloom | 65/378 |
| 6,052,503 A | 4/2000 | Schouten et al. | 385/114 |
| 6,063,888 A | 5/2000 | Yamaguchi et al. | 528/32 |
| 6,084,999 A | 7/2000 | Shen et al. | 385/43 |
| 6,112,001 A | 8/2000 | Kishida et al. | 385/49 |
| 6,136,880 A | 10/2000 | Snowwhite et al. | 522/64 |
| 6,148,129 A | 11/2000 | Pan et al. | 385/42 |
| 6,180,741 B1 | 1/2001 | Yamaguchi et al. | 385/123 |
| 6,220,059 B1 | 4/2001 | Klein et al. | 65/394 |
| 6,222,973 B1 | 4/2001 | Starodubov | 385/37 |
| 6,258,404 B1 | 7/2001 | Morgand et al. | 427/163.2 |
| 6,269,680 B1 | 8/2001 | Prieve et al. | 73/73.2 |
| 6,272,266 B1 | 8/2001 | Peck, Jr. | 385/34 |
| 6,282,343 B1 | 8/2001 | Kim et al. | 385/45 |
| 6,298,189 B1 | 10/2001 | Szum et al. | 385/128 |
| 6,301,412 B1 | 10/2001 | Mori et al. | 385/46 |
| 6,310,998 B1 | 10/2001 | Starodubov | 385/37 |
| 2001/0020049 A1 | 9/2001 | Takase et al. | 522/90 |

\* cited by examiner

| RANK | TTF D$_2$ COUPLER (HOURS) | TTF CONTROL COUPLER (HOURS) |
|---|---|---|
| 25 | 961 | |
| 24 | 1041 | |
| 23 | 1151 | |
| 22 | 1235 | |
| 21 | 1518 | |
| 20 | 1531 | |
| 19 | 1686 | |
| 18 | 2398 | |
| 17 | 2488 | |
| 16 | 2590 | |
| 15 | 3082 | |
| 14 | 3205 | |
| 13 | 3386 | |
| 12 | 3393 | |
| 11 | 3425 | 278 |
| 10 | 3529 | 519 |
| 9 | 3542 | 528 |
| 8 | 3853 | 533 |
| 7 | 3994 | 912 |
| 6 | 4341 | 928 |
| 5 | 6407 | 1207 |
| 4 | 7314 | 1305 |
| 3 | 15834 | 1331 |
| 2 | 17371 | 9310 |
| 1 | 30328 | 11020 |

*FIG. 8*

FIBER OPTIC DEVICE WITH ENHANCED RESISTANCE TO ENVIRONMENTAL CONDITIONS AND METHOD

FIELD OF THE INVENTION

The present invention relates to fabrication of fiber optic devices, and more particularly to a fabrication method that produces fiber optic devices having improved intrinsic resistance to external environmental conditions.

BACKGROUND OF THE INVENTION

The widespread and global deployment of fiber optic networks and systems mandates that fiber optic devices and components operate reliably over long periods of time. This mandate imposes stringent performance requirements on various fiber optic devices and components that are used in such networks and systems. In this respect, since fiber optic devices and components are expected to operate reliably for decades or more, prior to qualification for use, such components are typically subjected to an array of mechanical and environmental tests that are designed to measure their long term reliability.

Guarantees of long term performance become especially crucial in application where the cost of failure is very high (e.g., submarine applications.) One of these tests is a damp/heat soak test, where a fiber optic device or component is exposed to elevated temperature and humidity conditions (typically 85° C. and 85% relative humidity) for an extended period of time. Fiber optic couplers exposed to such conditions may exhibit a gradual drift in insertion loss. Eventually, this drift will cause a coupler to fail to meet its assigned performance specifications.

It is believed that the primary cause for the above-identified drift is water vapor or some component, constituent or by-product of water vapor diffusing into the exposed core glass of the coupler and changing the coupler's index of refraction.

In an attempt to prevent migration of moisture into the coupling region, it has been known to provide improved packaging for optic couplers, with the goal of eliminating exposure to external environment. For example, prior art approaches have included packaging fiber optic couplers and other fiber optic components inside a metal tubing and sealing the ends of the tubing with a polymeric material, such as a silicon-based material or epoxy. These types of packaging have not proved successful in preventing the aforementioned problem.

Other prior art approaches have focused on reducing the introduction of water vapor during the manufacturing process. These attempts include the use of heat sources, such as a solid state heaters alone, that introduce less hydrogen/water during fabrication of a coupler, than is introduced using an "open flame" heat source. However, these attempts have also failed. Such approaches are deficient because it has been discovered that the introduction of water and water related species during fabrication is not a major cause of long-term drift of optical properties under damp heat accelerated aging conditions. See Maack et. al, Confirmation of a Water Diffusion Model for Splitter Coupling Ration Drift Using Long Term Reliability Data. See also, Cryan et al., Long Term Splitting Ration Drifts in Singlemode Fused Fiber Optic Splitters, Proc. Nat. Fiber Opt. Eng. Conf. Jun. 18–22, 1995.

SUMMARY OF THE INVENTION

In accordance with the present invention, there is provided a method of forming an optical device having a region treated by deuterium, comprising the steps of maintaining first and second optic fibers proximate to one another along a segment, and fusing together the segment to form a coupling region in the presence of a flame produced by combustion of deuterium gas.

In another aspect, the invention provides a method where the first and second optical fibers have different propagation constants.

In another aspect, the invention provides a method where a diameter of said first optic fiber is modified to change the propagation constant.

In another aspect, the invention provides a method where the diameter of one of the optic fibers is modified by heating the optic fiber while stretching the first optical fiber to reduce its diameter in a portion of the optic fiber.

In another aspect, the invention provides a coupler comprising at least two optic fibers having respective longitudinal segments, where the longitudinal segments are fused together in the presence of a flame produced by combustion of deuterium gas.

In another aspect, the invention provides a method where another chemical or compound is added to the deuterium fuel.

In another aspect, the invention provides a method where oxygen is added to the deuterium fuel.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

In the art, the term "optic device" generally refers to active elements or apparatus, whereas the term "optic component" generally refers to passive elements or apparatus. The present invention is applicable to both fiber optic devices and fiber optic components. Accordingly, as used herein, the term "optic device(s)" shall refer both to optic ices and optic components.

Furthermore, it should be appreciated that while the present invention is described herein with particular reference to fiber optic couplers, it is contemplated that the present invention is applicable to other optic devices.

As is well known to those skilled in the art, a fiber optic coupler is a device that passively splits or combines light between two or more optical fibers. An evanescent-wave couple is one in which optical energy is transferred from one optical fiber to another by virtue of the electromagnetic field overlap between the two cores of the fibers. Since the evanescent field of an optical fiber is an exponentially decaying field, the cores of the two fibers must be brought into close proximity.

One common method for constructing evanescent-wave couplers is with a technique known as fused biconical taper (FBT). In fused biconical taper, couplers are fabricated by heating two optical fibers until they coalesce into a composite waveguiding structure. While the fibers are being heated, they are slowly stretched and tapered. This causes the light in the fiber to spread out far enough into the composite structure where it can be coupled to the other fiber.

Any number of optical fibers can be coupled together using the FBT technique. In addition, the various optical fibers that are coupled can be similar or dissimilar to one another. For example, one or more of the fibers can have different intrinsic propagation constants. In other cases, one or more of the fibers can also be pre-tapered or not pre-tapered. In other cases, the various fibers include a mix of different propagation constants and pre-tapering. Generally, the disclosed method of fabricating an optical device can be used regardless of the number and/or characteristics of any of the fibers involved.

It has long been known that the wavelength dependence of a single-mode coupler could be modified by fabricating the coupler with fibers having different propagation constants. A mismatch in the propagation constants of the two fibers that comprise the coupler can be simply introduced by preselecting two fibers having different propagation constants. However, since all fibers differ to some extent, successful results with one particular pair of fibers will not ensure similar results with another pair.

Because of the limitations associated with pre-selecting two fibers having different propagation constants, pre-tapering one or more of the optical fibers can be used to change the propagation constant of one or more of the fibers. In this way, wavelength flattened couplers and wavelength independent couplers can be made. Also, pre-tapering can also be used when manufacturing devices with intentionally high wavelength dependence, such as WDMs.

In one example, a method of making a single-mode evanescent-wave coupler having reduced wavelength dependence may be summarized by the following steps:

(a) providing first and second single-mode optical fibers having substantially identical propagation constants;

(b) modifying the diameter of the first optical fiber, e.g., by heating the first optical fiber along a first longitudinal segment thereof while stretching the first optical fiber to reduce the diameter of the first longitudinal segment, the reduced diameter being substantially uniform along the first longitudinal segment (referred to as "pre-tapering");

(c) maintaining the first and second optical fibers in parallel juxtaposition with one another along a portion of the first longitudinal segment; and (d) fusing together the portions of the first and second optical fibers maintained in parallel juxtaposition to form a coupling region.

A detailed description of the foregoing method is found in U.S. Pat. Nos. 4,798,438 and 4,632,513. These patents are incorporated herein by reference in their entirety.

A single-mode, evanescent-wave coupler is fabricated using two single-mode fibers. Each fiber has a core and cladding region. In many instances, the cladding region comprises two concentric cladding layers having different indices of refraction. The inner cladding layer has an index of refraction lower than that of the core of the fiber. The outer cladding layer, sometimes called the substrate, has an index of refraction greater than the inner cladding layer but not necessarily equal to the index of refraction of the core. This type of fiber is commonly called "depressed cladding" fiber by those skilled in the art. It should be noted that other types of fibers do not have an outer cladding layer or substrate having a relatively high index of refraction. These fibers are referred to as "matched cladding" fibers. Again, this is just one example of a coupler than can be made.

Referring now to the drawings where the illustrations are for the purpose of disclosing the preferred embodiment of the invention only, and not for the purpose of limiting same, an exemplary method for fabricating an optical device in accordance with the present invention will now be described.

Figure 1:
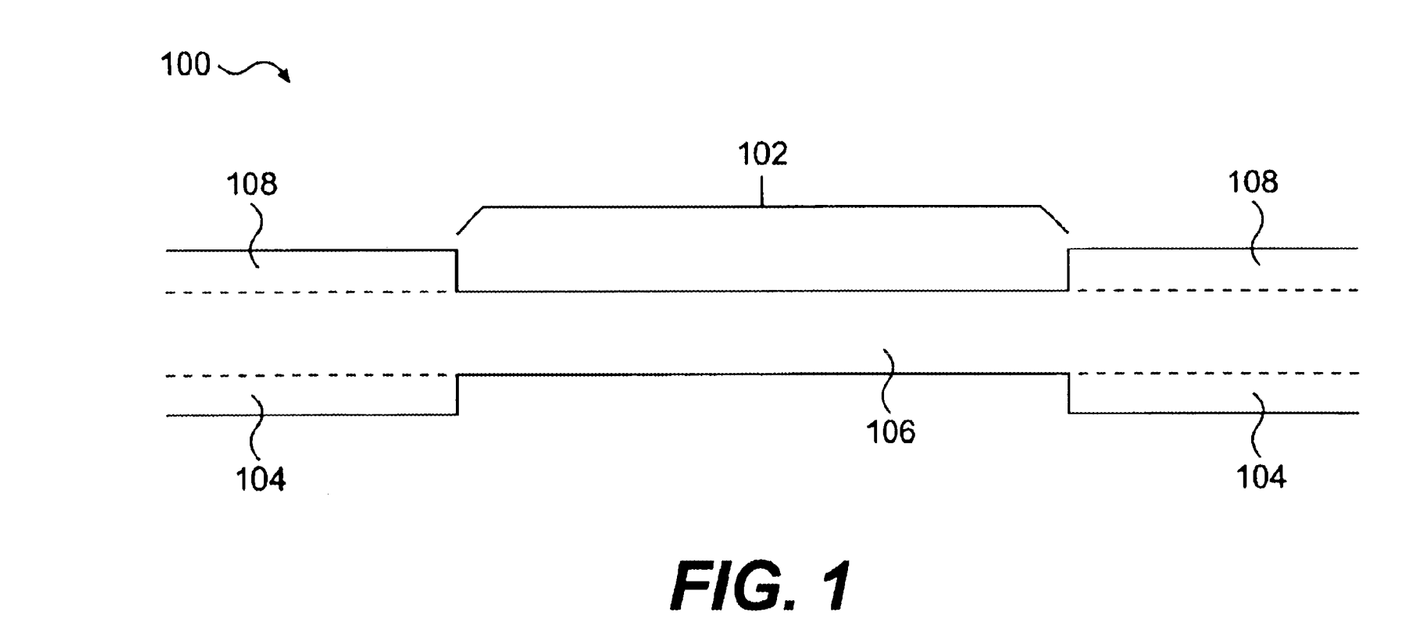
FIG. 1 is a schematic diagram of a preferred embodiment of an optical fiber before stretching.

FIG. 1 is a schematic diagram of a side view of an optical fiber. Optical fiber 100 includes a section 102. In some cases, this section is about three to four centimeters, but section 102 can be longer or shorter. Optical fiber 100 preferably includes a protective buffer layer 108 and in section 102, this protective layer 108 is preferably removed. Many different well known methods can be used to remove protective layer 108, including mechanical or chemical techniques. The exposed section 102 of fiber 100 is then preferably chemically cleaned and rinsed. A resultant fiber 100 is shown in FIG. 1 having a buffered region 104 and exposed region 106. Notice that buffered region 104 includes protective layer 108.

Generally, more than one fiber can be used to construct a fiber optic device, so the procedure for removing the protective layer of a fiber can be used on the appropriate fibers.

Figure 2:
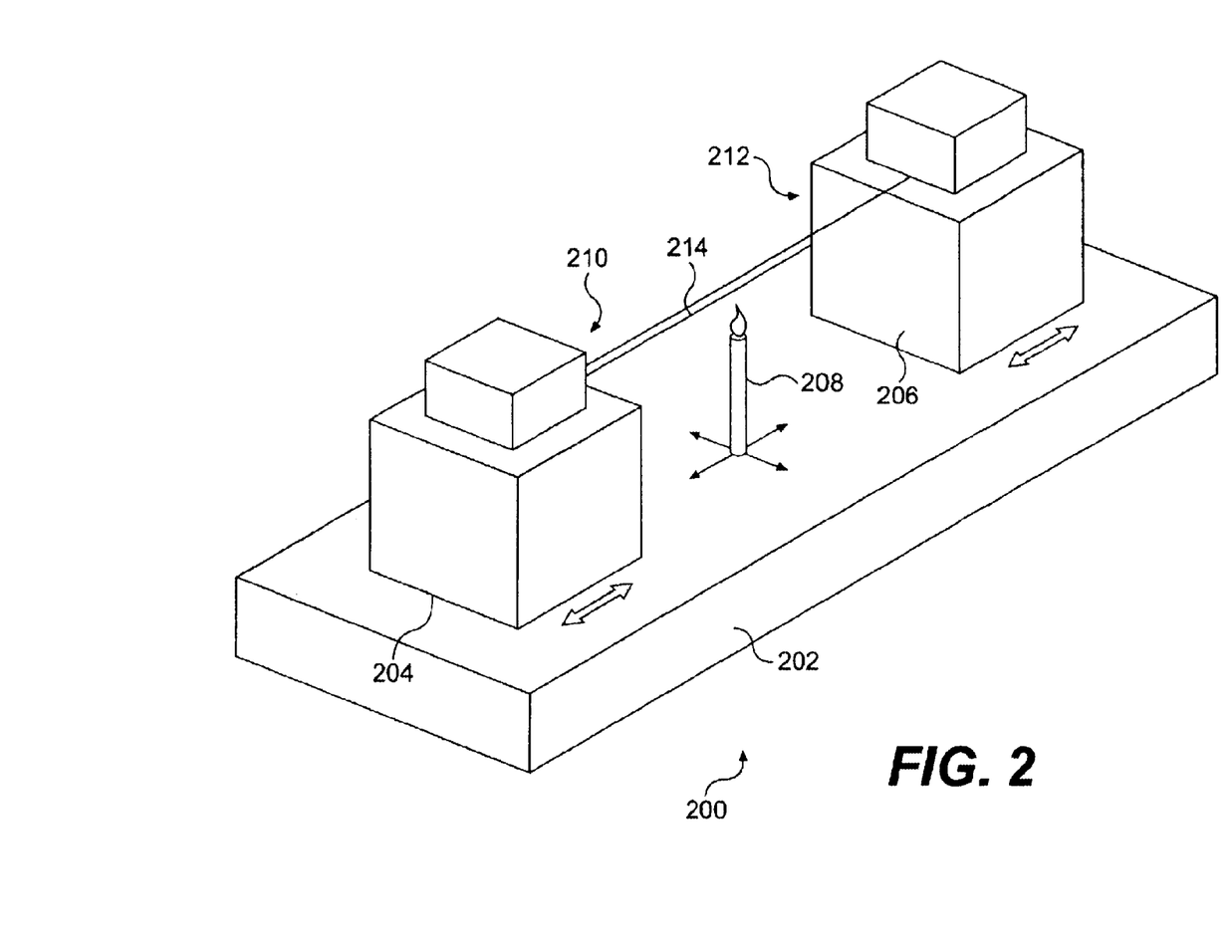
FIG. 2 is a schematic diagram of a preferred embodiment of an apparatus used to stretch an optical fiber.

FIG. 2 is a schematic diagram of an apparatus 200 for pre-tapering and stretching optical fiber. Apparatus 200 includes a base 202 and a first moving stage 204 and a second moving stage 206. Preferably, disposed between first and second stages 204 and 206, respectively, is a heating element 208. For purposes of description, first and second stages 204 and 206 are disposed along a longitudinal axis of base 202. Heating element 208 is preferably capable of motion in many different directions. For example, heating element 208 can move both longitudinally, that is, towards either the first 204 or second stage 206, and heating element 208 can also move laterally, that is, perpendicular to the longitudinal direction.

First and second stages 204 and 206 are capable of moving. In the embodiment shown in FIG. 2, first stage 204 can move towards and away from heating element 208 and also towards and away from second stage 206. Likewise, second stage 206 can move towards and away from heating element 208 and first stage 204. First stage includes a first grasping portion 210 and second stage 206 includes a second grasping portion 212. First and second grasping portions are designed to hold and retain an optical fiber 214.

Because of this arrangement, first stage 204 and second stage 206 are able to retain one or more fibers between them and their motion can be used to affect the retained fibers. In one example, where pre-tapering of one or more of the fibers is desired, the diameter of fiber 214 may be modified by mounting fiber 214 onto moveable stages 204 and 206 and heating a portion of fiber 214 with heating element 208. A movable gas torch 208 that provides a flame is preferably used as heating element 208.

While gas torch 208 moves with respect o fiber 214, first stage 204 and second stag 206 are slowly moved in opposite directions, in this case, away from each other, in order to stretch fiber 214 and reduce its diameter. This heating process is also referred to as a "flame brush process." Any time a torch flame is applied to fiber, deuterium can be used as the fuel for the flame. This includes the pre-taper process discussed above. It is possible to use regular hydrogen for the fuel in the pre-taper operation and then use deuterium for other stages of the manufacturing process. However, it is preferred that deuterium is used as the torch fuel for all of the manufacturing process steps.

Figure 3:
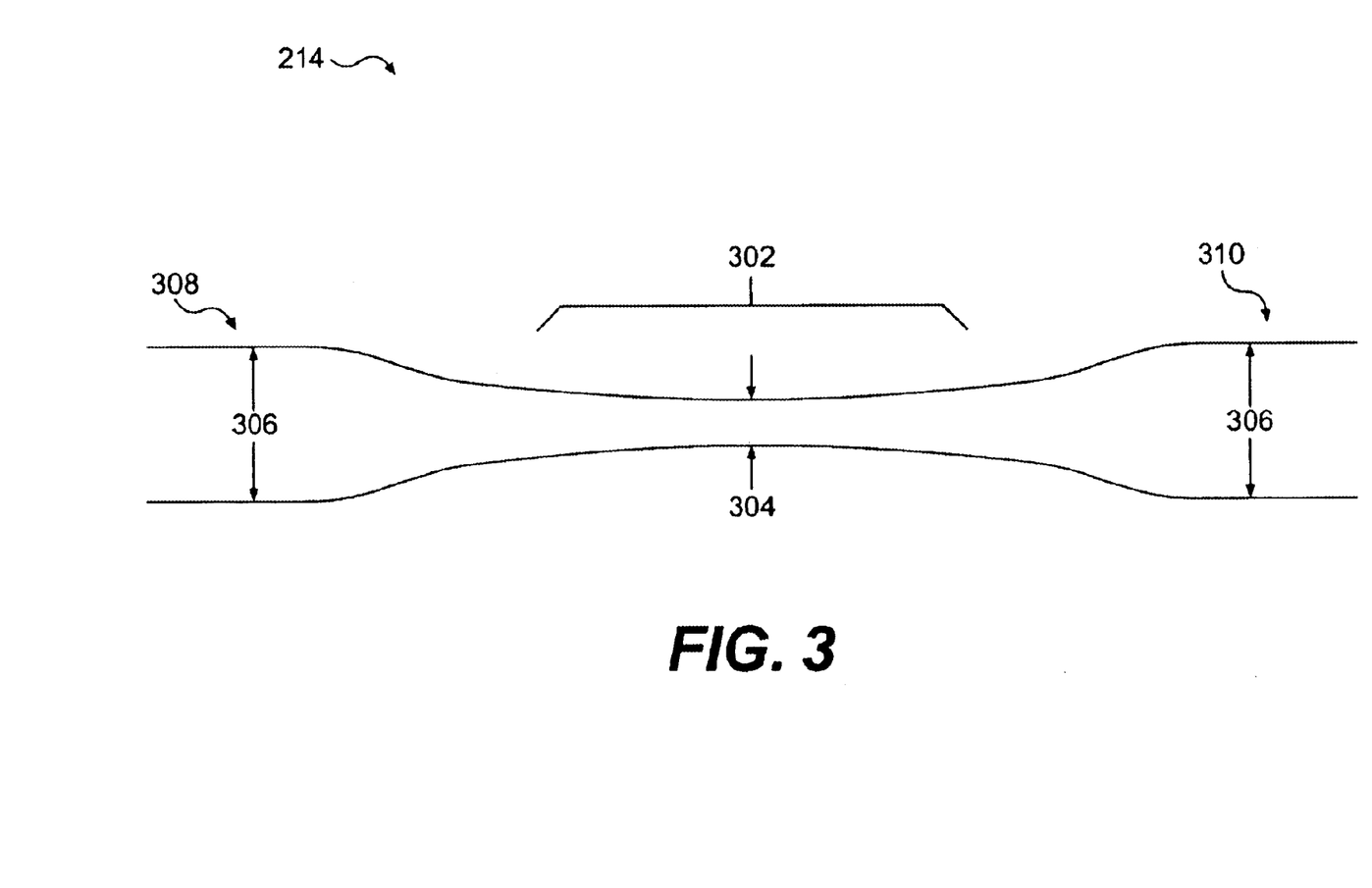
FIG. 3 is an enlarged schematic diagram of a preferred embodiment of an optical fiber after a pre-taper operation has been performed.

A typical profile of fiber 214 after being stretched and heated in this manner is shown in FIG. 3. Fiber 214 includes a heated section 302 that has a substantially constant yet reduced diameter 304 over a substantial length. Fiber 214 also includes a first un-stretched portion 308 and a second un-stretched portion 310. Heated section 302 gradually tapers up to the original fiber diameter 306 of un-stretched portions 308 and 310. The final diameter of fiber 214 in the heated region 302 is controlled by the amount fiber 214 is stretched. In some cases, a uniform relative motion between fiber 214 and the flame 208 (see FIG. 2) is used to obtain a constant fiber diameter along the heated section 302 of fiber 214. In this way, a pre-tapered fiber 214 that has been treated with deuterium is made.

In an alternative method to the stretching process described above, the diameter of a fiber cladding and core may be modified in accordance with an etching process. Although a variety of known etching techniques may be used, one suitable etching technique is a heated etching technique. In this technique, a fiber is placed in close proximity to an etching station which is heated by a thermoelectric module. An amount of etchant, usually a drop or so, is placed on top of the etching station to etch a longitudinal portion of the fiber. After the fiber has been etched to the desired diameter, the fiber is rinsed with water to prevent further etching.

Figure 4:
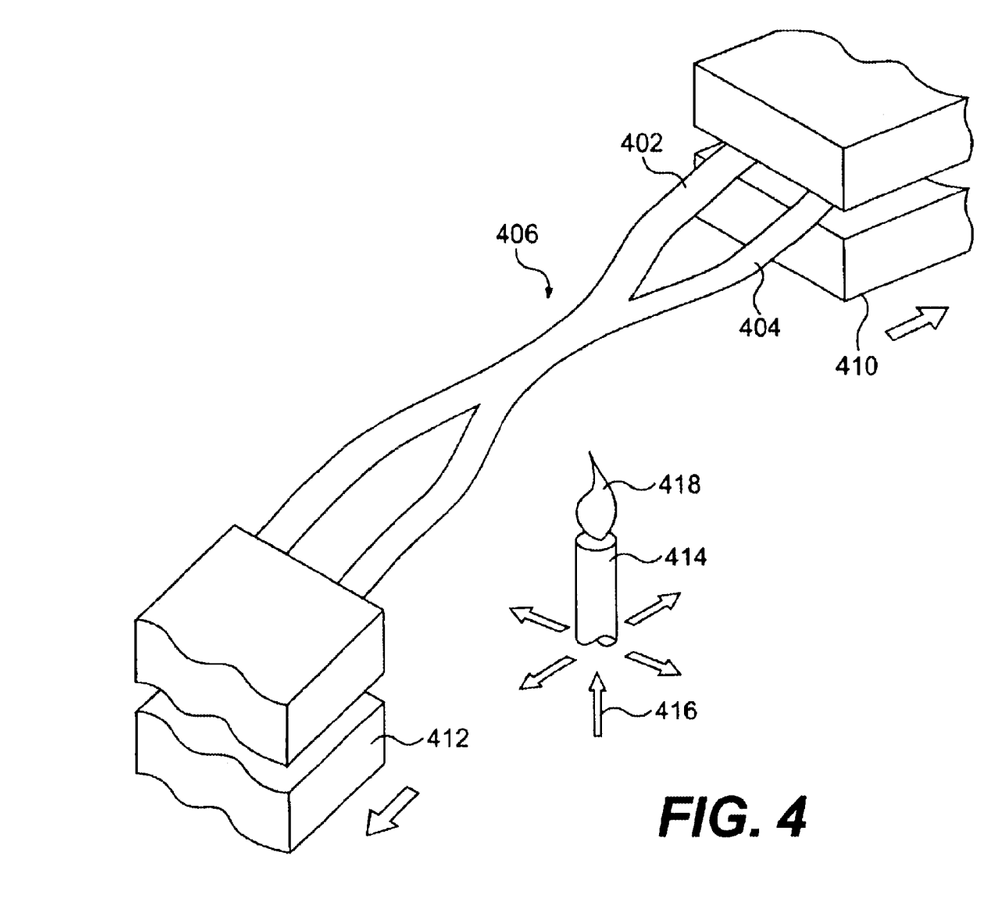
FIG. 4 is an enlarged isometric view of a preferred embodiment of an apparatus and a coupler.

FIG. 4 shows another embodiment of the present invention where multiple fibers are coupled. Although, for clarity, only two fibers are shown in the example shown in FIG. 4, any number of fibers can be coupled using this process. Embodiments with more than 2 fibers are certainly envisioned. The principles of the invention can be applied to situations where any time N number of fibers are drawn while a torch flame is applied. For example, U.S. Pat. No. 5,355,426, assigned to the same assignee as the present invention and which is herein incorporated by reference in its entirety, teaches an MxN coupler. The present invention can be used to make those MxN couplers disclosed in U.S. Pat. No. 5,355,426, as well as any other coupler having any number of coupled fibers.

Returning to FIG. 4, a first fiber 402 and a second fiber 404 are positioned proximate one another and retained by grasping members 410 and 412. Grasping members 410 and 412 can be any device that is capable of securely retaining and holding optical devices. Preferably, grasping members 410 and 412 are mounted to movable stages as shown in FIG. 2. In the embodiment shown in FIG. 4, first and second fibers 402 and 404 are initially wound together to form a coupling region 406.

With reference to FIG. 4, fibers 402 and 404 are preferably maintained proximate to one another as coupling region 406 is heated and formed. In an exemplary embodiment, fibers 402 and 404 are maintained in parallel juxtaposition. Coupling region is fused in order to form a coupler. In this regard, fusion occurs by heating coupling region 406 while grasping members 410 and 412 stretch fibers 402 and 404. It should be appreciated that fibers 402 and 402 may be twisted together along portions of their length prior to heating and stretching.

In accordance with an embodiment of the present invention, the heating source is preferably a gas torch beat source 414, as described above. However, in accordance with the present invention, heat source 414 uses deuterium ($D_2$) gas as a fuel supply 416 to produce a flame 418, as will be explained further below. Heat source 414 can be moved about coupling region 406 while fibers 402 and 404 are in axial tension. Heat source 414 can be applied until fibers 402 and 404 are fused together throughout the desired length of coupling region 406. Accordingly, a deuterium treated optic coupler is produced.

It should be understood that the coupler fabrication method described above is exemplary, and that alternative methods of fabricating couplers using a heat source are well known to those skilled in the art. The present invention is suitable for use in connection with these alternative fabrication methods, wherein the heat source is suitably modified to provide a flame produced by the combustion of deuterium gas.

Furthermore, it should be understood that the fibers being heated and fused to form a coupler may include identical fibers, for example, having the same propagation constants, or the fibers can be mismatched fibers, for example, having different propagation constants. Again, this heating method, that uses deuterium as its fuel supply, can be used regardless of the number, characteristics, and/or the similarities or differences among the various fibers that are coupled.

In accordance with the present invention, the conventional gas, usually hydrogen gas ($H_2$), that is used as a fuel supply in gas torch heat source to generate a flame, is replaced with deuterium ($D_2$) gas. A flame is produced by the combustion of deuterium gas, rather than the conventional gas, usually hydrogen gas. Deuterium, being a nuclear isotope of hydrogen, is for all practical purposes chemically similar to hydrogen. However, deuterium is heavier than hydrogen, and various modifications can be made to the manufacturing process to accommodate the slight weight difference between hydrogen and deuterium. For example, the gas flow rate for the deuterium gas can be modified from the gas flow rate used for hydrogen gas to optimize combustion, and achieve a suitable pull signature. In some embodiments, a mixture of deuterium and another gas is used.

In one embodiment, a deuterium flame is applied at room pressure (~1 atm) and room temp. (~20 C.). Flow rate of deuterium gas is around 215 sccm for a standard wavelength flattened 50% coupler, but will vary from device to device. Oxygen, as well as other elements, may also be added as a torch fuel as the recipe requires.

Generally, most typical devices are made by supplying hydrogen only to the torch. As indicated in other portions of this disclosure, a typical flow rate would be 215 sccm deuterium. Since no oxygen is supplied to the torch as a fuel, this can be referred to as a 100% deuterium mixture, but of course ambient oxygen is consumed in the combustion and ambient oxygen participates in the combustion process.

In other embodiments, oxygen is supplied to the torch. This can be a way of controlling flame temperature and size.

Oxygen can also be supplied to control the completeness of the combustion. And, oxygen can be supplied to control the rate of combustion as well.

The following is one embodiment where oxygen is added to the deuterium fuel. A certain kind of microcoupler is typically pulled with 85 sccm hydrogen and 30 sccm oxygen.

Another embodiment where oxygen is added to the deuterium is a kind of coupler that employs an 80 micron payout fiber. (A reduced cladding fiber, RC 1300). The recipe for this involves an elaborated series of steps in which the hydrogen/oxygen mixture is varied greatly.

In an initial "prefuse" step, the $D_2/O_2$ mixture is set to 70 sccm/250 sccm (22% $D_2$ by volume). After the torch has been placed under the fibers, the flow are settings are changed to 124 sccm $D_2$/250 sccm $O_2$ (33% $D_2$ by volume, with higher total flow rate).

After this initial "prefuse", the coupler is pulled with 90 sccm deuterium, with no oxygen.

These examples illustrate the wide range of possible $D_2/O_2$ mixtures. Not only do the percentages vary widely, but also the total flow rates. Also, oxygen can be added to only certain steps in the manufacturing process and omitted in other steps.

Furthermore, in any process where hydrogen is conventionally used, deuterium can be substituted to make a passivated version of the device. And, in addition, other elements or compounds can also be added if desired. Also, oxygen can be replaced with other chemicals if desired.

In accordance with the present invention, control parameters for stretching a fiber during coupler fabrication may be modified from standard settings wherein a hydrogen gas fuel supply is used. For instance, in the case of fabrication of 50% wavelength-flattened optic couplers, the primary modification of the control parameters is the pre-taper settings.

In this regard, optic couplers produced using a deuterium gas fueled heat source (referred to herein as "deuterium couplers") require that the pre-tapered fiber have a significantly greater degree of pre-taper than couplers fabricated using a hydrogen gas fueled heat source. It is believed that the "deuterium heating" method may effect the refractive index of the fibers differently than the standard "hydrogen heating" method.

As shown below, preliminary observations indicate that using deuterium ($D_2$) gas as a fuel supply for the heat source effectively doubles the median "time to failure" (TTF) of devices in 85° C./85% relative humidity (RH) environmental testing.

The present invention will now be further described by way of the following examples:

EXAMPLE 1

Deuterium Passivation Damp Heat Aging Experiment

Twenty-five (25) 50% wavelength flattened optic couplers (WFC) were manufactured using a deuterium gas fueled heating source, with the goal of attaining passivation (i.e., to treat in order to reduce the chemical reactivity of its surface) of the couplers to damp heat aging. These deuterium couplers, along with eleven (11) 50% WFCs produced using the standard "hydrogen heating" method, were aged at 85° C. and 85% relative humidity (RH) for approximately 2000 hours and 1265 hours, respectively. The eleven standard couplers act as a control group.

Optic Fiber Parameters for 50% WFC Deuterium Coupler:
$D_2$ flow rate: 215 sccm
$O_2$ flow rate: 0 sccm
Stage separation: 40 mm
Pre-taper torch velocity: 22 mm/min
Pre-taper flame brush width: 11 mm
Pre-taper right stage velocity: 2.75
Pull torch velocity: 36 mm/min
Pull flame brush width: 6.5 mm
Pull left stage velocity: 2.5 mm/min
Pull right stage velocity: 2.5 mm/min
Pull after stop jump: 3.5%
Torch height: 10.5 mm
Pull distance: 7.16 mm (average)
Pretaper fiber diameter: 117.85 microns Optic Fiber Parameters for 50% WFC Standard Coupler:
$D_2$ flow rate: 215 sccm
$O_2$ flow rate: 0 sccm
Stage separation: 40 mm
Pre-taper torch velocity: 22 mm/min
Pre-taper flame brush width: 11 mm
Pre-taper right stage velocity: 1.65 mm/min
Pull torch velocity: 36 mm/min
Pull flame brush width: 6.5 mm
Pull left stage velocity: 2.5 mm/min
Pull right stage velocity: 2.5 mm/min
Pull after stop jump: 3.5%
Torch height: 10 mm
Pull distance: 7.75 mm (average)
Pretaper fiber diameter: 120.56 microns Procedure:
Coupling ratio (CR) data were processed to correct for artifacts of the measurement system, specifically the appearance of piecewise discontinuities. Times to failure (TTF) were extrapolated from a linear least squares fit to data in cases where the device did not exhibit failure within the duration of the test. Failure criterion is a change in CR of 0.2 dB.

Figure 8:
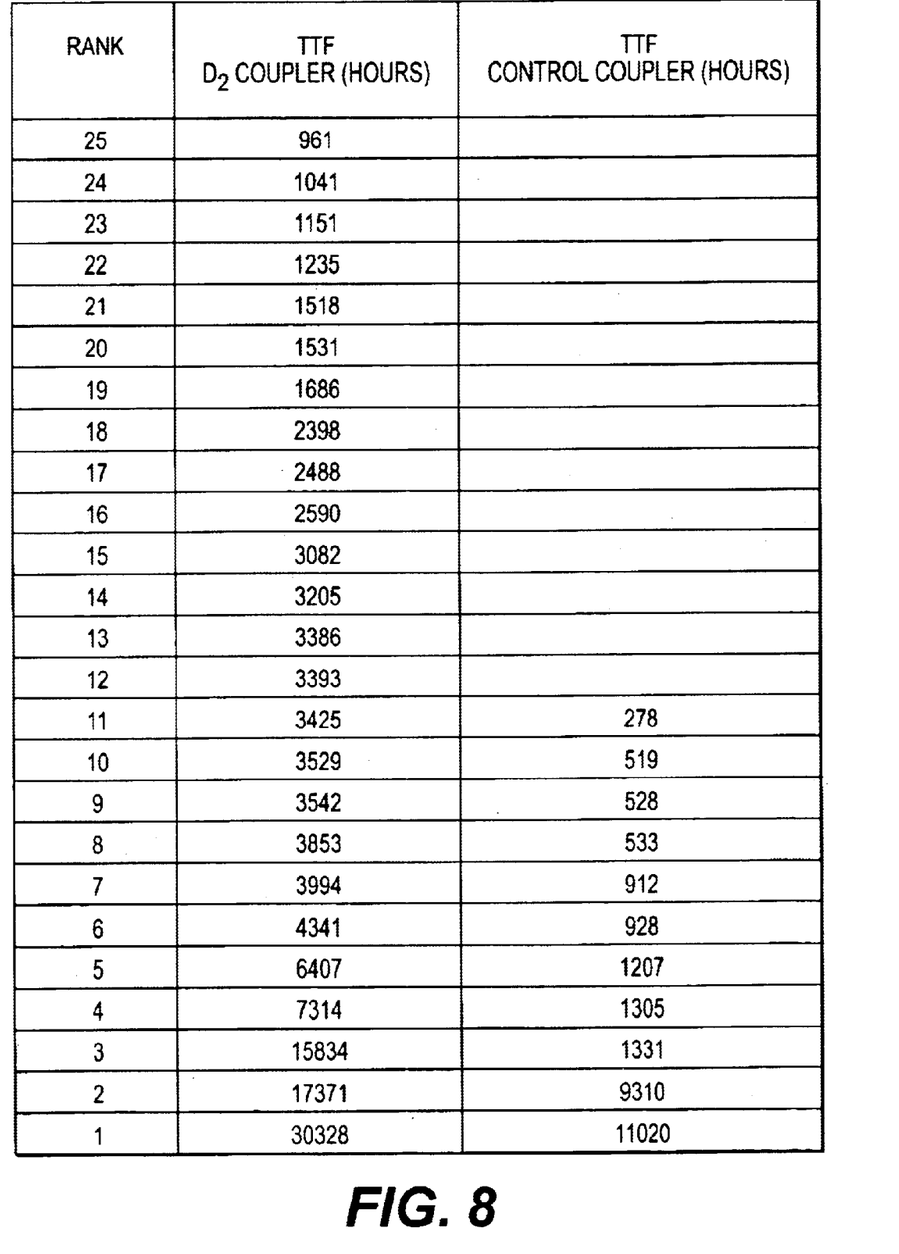
FIG. 8 is a table including data from TTF experiments.

Results:
FIG. 8, includes a table that includes a ranking of TTF (median time to failure) for optic couplers fabricated using deuterium ($D_2$) gas as a heat source fuel supply ("deuterium couplers"), and for optic couplers fabricated using conventional hydrogen gas as a heat source fuel supply ("standard couplers")

It is observed that the median time to failure (TTF) for the deuterium couplers is approximately 3,300 hours. In contrast, the median time to failure for the standard couplers is approximately 1000 hours. The fraction of deuterium couplers with TTF>2000 hrs is 18/25, while the fraction of standard couplers with TTF>2000 hrs is 2/11. Failure criterion is a change in splitting loss of 0.2 dB or greater.

Figure 5:
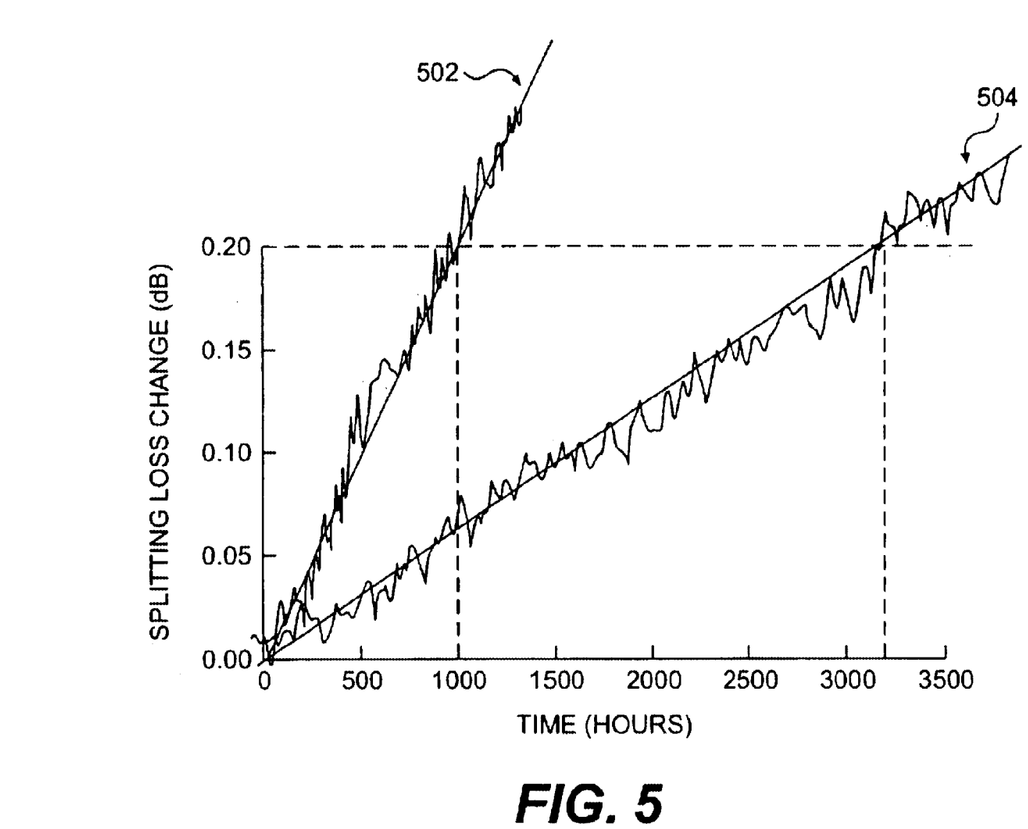
FIG. 5 is a graph showing change is splitting loss over time.
Figure 6:
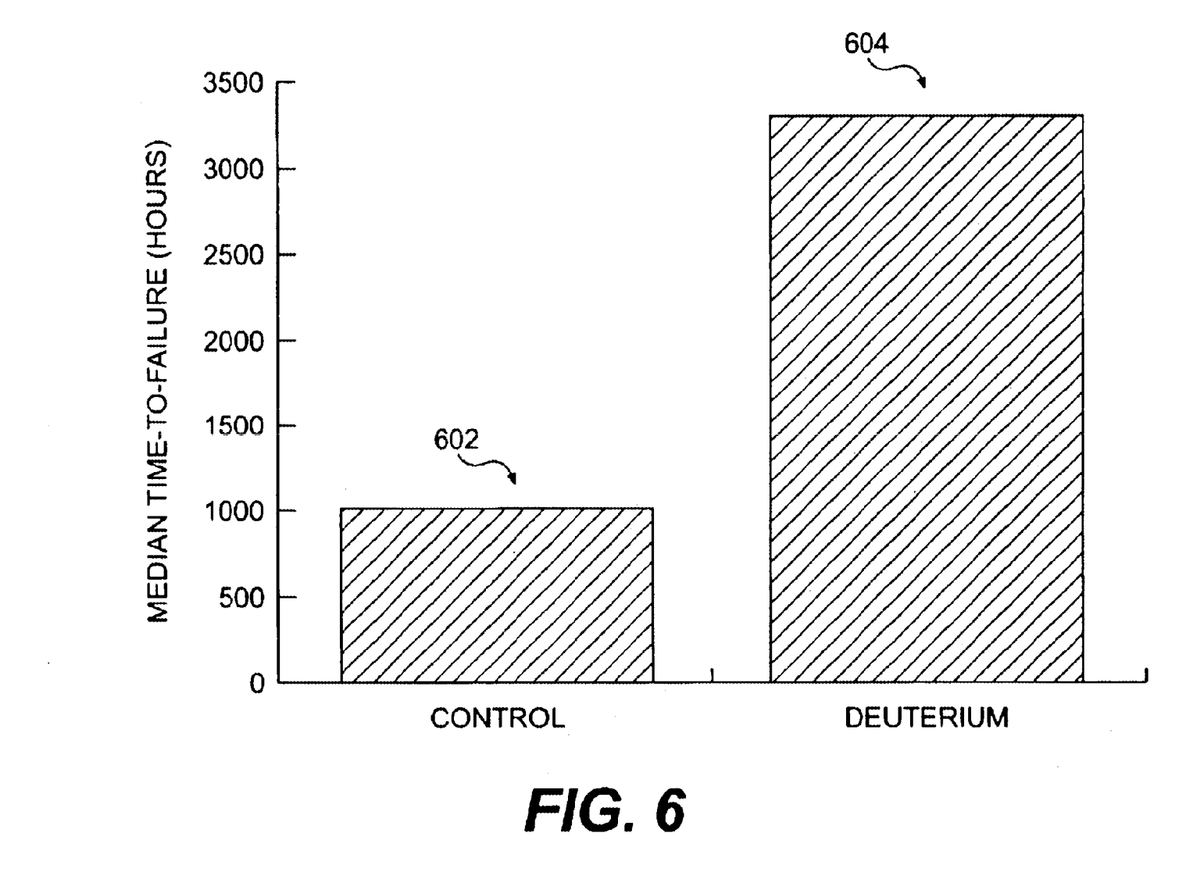
FIG. 6 is a graph showing median time to failure for various optical devices.

FIG. 5 is a graph showing the average splitting loss change in decibels (dB) versus time, in hours, in a high temperature, high humidity environment, for a number of control couplers 502 and a number of deuterium treated couplers 504 in accordance with the present invention. The deuterium treated couplers 504 are significantly more tolerant of adverse environmental conditions. The deuterium treated couplers 504 were able to perform with a splitting loss change of less than 0.20 dB for more than three times the duration of a conventional optical coupler 502. This is also shown in FIG. 6, which shows a bar graph comparing the mean time to failure for a control group 602 and a deuterium treated group 604.

Figure 7:
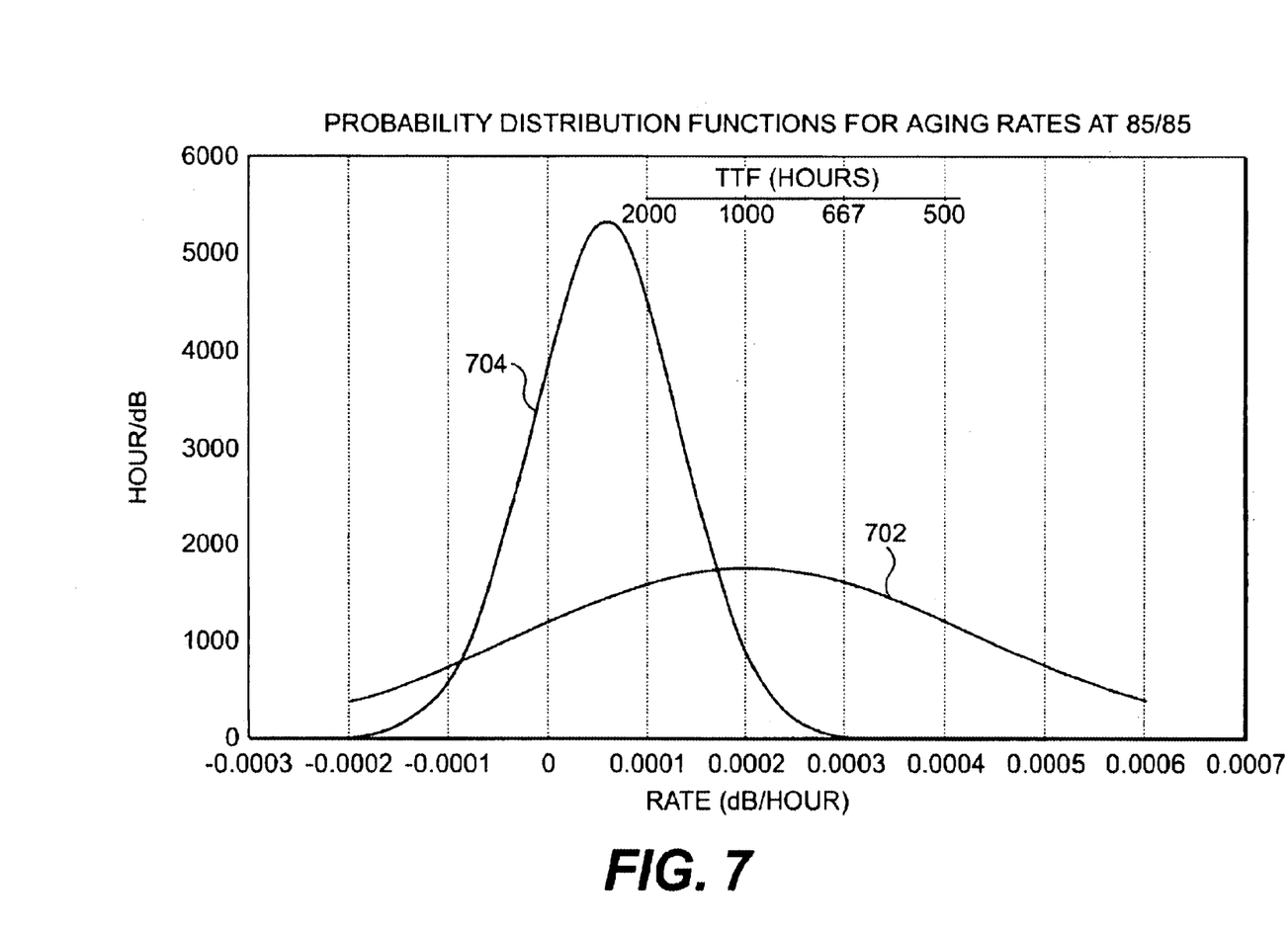
FIG. 7 is a chart showing probability distributions of rates of change of splitting loss at 85° C./85%RH.

FIG. 7 is a chart showing probability distributions of rates of change of splitting loss at 85C/85%RH for both control 702 and deuterium 704 passivated couplers. These distributions illustrate the advantage of the deuterium passivated couplers over the control devices. As clearly demonstrated in FIG. 7, the rates of splitting loss change for the former is reduced by a factor of approximately 3.3 with respect to the latter. This both increases the median time to failure (MTF) by a factor of approximately 3.3 and also results in a narrower distribution in aging rates.

It should be understood that the present invention can be used regardless of the other particular details for manufacturing optic devices (e.g., pulling methods, clamping methods, fiber arrangement, etc.) In this regard, the present invention is suitably used in connection with a wide variety of coupler manufacturing methods and packaging strategies. Moreover, the present invention may be applied in combination with other techniques for improving reliability and performance of optic devices.

Other modifications and alterations will occur to others upon their reading and understanding of the specification. In this regard, it should be appreciated that the fabrication method of the present invention may be suitably used with any heating technique that applies a flame to an optic device during fabrication thereof. It is intended that all such modifications and alterations be included insofar as they come within the scope of the invention as claimed or the equivalents thereof.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Having described the invention, the following is claimed:

1. A method of forming an optical device having a region treated by deuterium, comprising:
   maintaining first and second optic fibers proximate to one another along a segment; and
   fusing together the segment to form a coupling region in the presence of a flame produced by combustion of deuterium gas,
   wherein the optic device has a first condition where the optic device has a first splitting loss of a certain quantity;
   wherein the optic device has a second condition where the optic device has a change in splitting loss of less than 0.2 dB relative to the first splitting loss; and
   wherein the second condition is achieved after 2000 hours in an environment having a temperature of substantially 85 degrees Celsius and a relative humidity of substantially 85%.

2. A method according to claim 1, wherein said first and second optical fibers have different propagation constants.

3. A method according to claim 2, wherein a diameter of said first optic fiber is modified to change the propagation constant associated therewith.

4. A method according to claim 3, wherein the diameter of said first optic fiber is modified by heating the first optic fiber while stretching the first optical fiber to reduce the diameter of a longitudinal segment thereof.

5. A method according to claim 4, wherein said step of heating the first optic fiber includes producing a flame by combustion of deuterium gas.

6. A method according to claim 1, wherein a chemical is added to the deuterium gas.

7. A method according to claim 1, wherein oxygen is added to the deuterium gas.

8. An optic coupler comprising:
   at least two optic fibers having respective longitudinal segments, wherein said longitudinal segments are fused together in the presence of a flame produced by combustion of a mixture including deuterium;
   wherein the optic coupler has a first condition where the optic coupler has a first splitting loss of a certain quantity;
   wherein the optic coupler has a second condition where the optic coupler has a change in splitting loss of less than 0.5 dB relative to the first splitting loss; and
   wherein the second condition is achieved after 2000 hours in an environment having a temperature of substantially 85 degrees Celsius and a relative humidity of substantially 85%.

9. An optic coupler comprising:
   at least two optic fibers having respective longitudinal segments, wherein said longitudinal segments are fused together in the presence of a flame produced by a mixture including deuterium;
   wherein the optic coupler has a first condition where the optic coupler has a first splitting loss of a certain quantity;
   wherein the optic coupler has a second condition where the optic coupler has a change in splitting loss of less than 2 dB of the first splitting loss;
   and wherein the second condition is achieved after 2000 hours in an environment having a temperature of substantially 85 degrees Celsius and a relative humidity of substantially 85%.

10. The optic coupler according to claim 9, wherein the at least two optic fibers have different propagation constants.

11. The optic coupler according to claim 9, wherein a diameter of a first optic fiber of the at least two optic fibers is modified to change the propagation constant associated therewith.

12. The optic coupler according to claim 11, wherein the diameter of the first optic fiber is modified by heating the first optic fiber while stretching the first optical fiber to reduce the diameter of a longitudinal segment thereof.

13. The optic coupler according to claim 12, wherein the heating the first optic fiber includes producing a flame by combustion of deuterium gas.

14. The optic coupler according to claim 9, wherein a chemical is added to the mixture.

15. The optic coupler according to claim 9, wherein oxygen is added to the mixture.

16. The optic coupler according to claim 8, wherein the at least two optic fibers have different propagation constants.

17. The optic coupler according to claim 8, wherein a diameter of a first optic fiber of the at least two optic fibers is modified to change the propagation constant associated therewith.

18. The optic coupler according to claim 17, wherein the diameter of the first optic fiber is modified by heating the first optic fiber while stretching the first optical fiber to reduce the diameter of a longitudinal segment thereof.

19. The optic coupler according to claim 18, wherein the heating the first optic fiber includes producing a flame by combustion of deuterium gas.

20. The optic coupler according to claim 8, wherein a chemical is added to the mixture.

21. The optic coupler according to claim 8, wherein oxygen is added to the mixture.

* * * * *